United States Patent
Tournier et al.

(10) Patent No.: US 6,680,750 B1
(45) Date of Patent: Jan. 20, 2004

(54) DEVICE AND METHOD FOR COLLECTING AND ENCODING SIGNALS COMING FROM PHOTODETECTORS

(75) Inventors: Edmond Tournier, Saint Martin d'Vriage (FR); Claude Janin, Grenoble (FR); Corinne Mestais, La Terrasse (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/269,753

(22) PCT Filed: Oct. 10, 1997

(86) PCT No.: PCT/FR97/01810

§ 371 (c)(1),
(2), (4) Date: Jun. 1, 1999

(87) PCT Pub. No.: WO98/16851

PCT Pub. Date: Apr. 23, 1998

(30) Foreign Application Priority Data

Oct. 14, 1996 (FR) .............................. 96 12495

(51) Int. Cl.[7] .......................... H04N 3/14; G01T 1/164
(52) U.S. Cl. .................. 348/294; 250/363.02
(58) Field of Search ............ 348/294; 250/363.02, 250/366, 369, 370.08, 370.09; 378/98.2, 98.8

(56) References Cited

U.S. PATENT DOCUMENTS

| 3,011,057 A |   | 11/1961 | Anger |
| 4,672,542 A |   | 6/1987  | Roux et al. |
| 4,882,680 A | * | 11/1989 | Bonnefoy-Claudet et al. ........ 250/363.02 |
| 4,900,931 A |   | 2/1990  | Tournier et al. |
| 5,276,615 A | * | 1/1994  | Tournier Edmond et al. ....... 250/363.02 |
| 5,448,073 A | * | 9/1995  | Jeanguillaume ........ 250/363.02 |
| 5,461,425 A | * | 10/1995 | Fowler et al. ............. 348/294 |
| 6,057,551 A | * | 5/2000  | Tararine ................... 250/369 |

FOREIGN PATENT DOCUMENTS

FR        2 669 439      5/1992

* cited by examiner

*Primary Examiner*—Wendy R. Garber
*Assistant Examiner*—Luong Nguyen
(74) *Attorney, Agent, or Firm*—Oblon, Spivak, McClelland, Maier & Neustadt, P.C.

(57) ABSTRACT

A device for collection, digital encoding, and processing of signals from plural photo-detectors in a camera. The device includes plural digital encoding units, each digital encoding unit in the plural encoding units being associated with one individual photo-detector in the plural photo-detectors, and including a summation device and an analog-digital converter. A digital processing unit is connected to each encoding unit. Such a device may find particular application to gamma-cameras.

6 Claims, 3 Drawing Sheets

DEVICE AND METHOD FOR COLLECTING AND ENCODING SIGNALS COMING FROM PHOTODETECTORS

TECHNICAL DOMAIN

This invention relates to a device and process for collection, encoding and processing of signals output from photo-detectors.

The invention is particularly applicable to collection and encoding of signals output by photo-multipliers used in gamma-cameras. A gamma-camera is a camera sensitive to gamma ($\gamma$) radiation. This type of camera is used particularly for medical imagery purposes.

STATE OF PRIOR ART

At the present time, most gamma-cameras used in nuclear medicine operate using the principle of Anger type cameras. Document (1) in the list of references at the end of this description provides further information about this subject.

Gamma-cameras have the specific feature that they display the distribution of molecules marked by a radioactive isotope previously injected into the patient, within an organ.

The structure and operation of a known gamma-camera are described and summarized below with reference to the attached FIGS. 1, 2A and 2B.

FIG. 1 shows a detection head 10 of a gamma-camera placed facing an organ 12 containing molecules marked by a radioactive isotope.

The detection head 10 comprises a collimator 20, a scintillator crystal 24, a light guide 22 and several photo-multiplier tubes 26 placed adjacent to each other so as to cover one surface of the light guide 22 opposite the scintillator crystal 24. For example, the scintillator may be an NaI(Tl) crystal.

The function of the collimator 20 is to select the radiation which reaches the detection head at an approximately normal incidence, among all the gamma radiation 30 emitted by organ 12. The selective nature of the collimator can increase the resolution and the sharpness of the image produced. However, the resolution is increased at the expense of sensitivity. For example, only one photon among about 10,000 $\gamma$ photons emitted by organ 12, is actually detected.

The $\gamma$ photons that passed through the collimator arrive at the scintillator crystal 24, where almost all $\gamma$ photons are converted into several light photons. In the rest of this text, each interaction of a gamma photon with the crystal causing a scintillation is called an event.

Photo-multipliers 26 are designed to emit an electric pulse proportional to the number of light photons received from the scintillator for each event.

In order for a scintillation event to be more precisely localized, photo-multipliers 26 are not directly fixed to the scintillator crystal 24 but are separated from it by the light guide 22.

Photo-multipliers emit a signal, the amplitude of which is proportional to the total quantity of light produced in the scintillator by gamma radiation, in other words proportional to its energy. However, the individual signal from each photo-multiplier also depends on the distance that separates it from the point 30 at which the gamma radiation interacts with the scintillator material. Each photo-multiplier outputs a current pulse proportional to the light flux that it received. In the example in FIG. 1, small graphs A, B and C show that photo-multipliers 26a, 26b and 26c located at different distances from an interaction point 30 output signals with different amplitudes.

The position of the interaction point 30 of a gamma photon is calculated in the gamma-camera starting from signals originating from all photo-multipliers by taking a center of gravity weighting of the contributions of each photo-multiplier.

The principle of center of gravity weighting as used in Anger type cameras can be explained more clearly with reference to attached FIGS. 2A and 2B.

FIG. 2A shows the electric wiring of a gamma-camera detection head 10, that connects this camera to a digital image generation unit. The detection head comprises several photo-multipliers 26.

As shown in FIG. 2B, each photo-multiplier 26 in the detection head is equipped with four resistances denoted $RX^-$, $RX^+$, $RY^-$ and $RY^+$. The values of these resistances are specific to each photo-multiplier and depend on the position of the photo-multiplier in the detection head 10.

Resistances $RX^-$, $RX^+$, $RY^-$ and $RY^+$ in each photo-multiplier are connected to the output 50 of the said photo-multiplier, represented in FIG. 2B by a current generator symbol. They are also connected to common collecting lines denoted $LX^-$, $LX^+$, $LY^-$ and $LY^+$ respectively in FIG. 2A.

Lines $LX^-$, $LX^+$, $LY^-$ and $LY^+$ are in turn connected to analog integrators $52X^-$, $52X^+$, $52Y^-$ and $52Y^+$ respectively, and through these integrators to analog-digital converters $54X^-$, $54X^+$, $54Y^-$ and $54Y^+$ respectively. The output from converters $54X^-$, $54X^+$, $54Y^-$ and $54Y^+$ is directed towards a digital operator 56. Lines $LX^-$, $LX^+$, $LY^-$ and $LY^+$ are also connected to a common channel, called the energy channel. This channel also comprises an integrator 57 and an analog-digital converter 58, and its output is also sent towards operator 56.

The device in FIG. 2 is used to calculate the position of the interaction according to the following equations:

$$X = \frac{X^- - X^-}{X^+ + X^-} \text{ and } Y = \frac{Y^+ - Y^+}{Y^- + Y^-}$$

in which X and Y are the coordinates along two orthogonal directions of the position of the interaction on the crystal, and $X^+$, $X^-$, $Y^+$, $Y^-$ represent the weighted signals output by integrators $52^+$, $52^-$, $52^+$, $52^-$ respectively.

The values of X and Y, and the total energy E of the gamma ray that interacted with the crystal, are established by the digital operator 56. These values are then used to generate an image.

Documents (2), (3) and (4), listed in the references at the end of this description, contain more information about this subject.

The calculation of the interaction position is affected by an uncertainty related to Poisson statistical fluctuations in the number of light photons and the number of photoelectrons produced for each event, in other words for each detected gamma photon. The standard deviation of the fluctuation reduces when the number of photons or photoelectrons increases. Due to this phenomenon, light should be collected as carefully as possible. The intrinsic spatial resolution of the camera is characterized by the width at the mid-height of the distribution of positions calculated for the same collimated point source placed on the scintillator crystal.

The intrinsic resolution for gamma rays with an energy of 140 keV is usually of the order of 3 to 4 mm.

The energy of a detected gamma photon is calculated by taking the sum of the contributions of all photo-multipliers that received light. It is also affected by a statistical fluctuation. The energy resolution of the camera is characterized by the ratio of the width at the mid-height of the distribution of calculated energies, to the average value of the distribution, for the same source.

The energy resolution is usually of the order of 9 to 11% for gamma rays with an energy of 140 keV.

Finally, an Anger type gamma-camera has the advantage that it enables real time calculation of the center of gravity of photo-multiplier signals with very simple means.

The system described above has a limited number of components. Furthermore, the resistances used to inject the photo-multiplier signal in collecting lines are not very expensive.

However, this type of camera also has a major disadvantage, which is a low count rate. The count rate is the number of events, in other words the number of interactions between a γ photon and the scintillator, that the camera is capable of processing per unit time.

The limitation in the count rate is particularly due to the fact that the camera is incapable of processing two events that take place approximately simultaneously at separate points in the scintillator crystal.

Simultaneous but geometrically distinct events create electrical signals that build up in the $LX^+$, $LX^-$, $LY^+$, $LY^-$ collecting lines and which can no longer be distinguished. These events are also "lost" for the formation of an image. Document (6), the reference of which is given at the end of this description, describes a deconvolution method for stacked pulses in order to separate them and improve the count rate.

The limitation in the count rate is not an excessively important constraint in traditional medical imagery techniques. As mentioned above, the collimator stops a very large number of gamma rays and only a small number of events are actually detected.

However, gamma-cameras are also used in two other medical imagery techniques in which the limitation of the count rate is an unacceptable constraint.

These techniques are called "correction of transmission attenuation" and "coincident PET" (Positron Emission Tomography).

The correction of transmission attenuation technique consists of taking account of the attenuation specific to the tissue of the patient surrounding the examined organ, during the formation of a medical image. In order to determine this attenuation, the transmission of X or gamma radiation through the patient's body to a gamma-camera is measured. This is done by putting the patient between a highly active external source and the gamma-camera detection head. The source activity must be high so that the acquisition can be made and be statistically significant within a sufficiently short time so that there is no need to extend the duration of the examination. Thus when measuring the transmitted radiation, a large number of events take place in the scintillator crystal. The large number of events per unit time also increases the probability of having several almost simultaneous events. A conventional Anger type camera is then not suitable.

The PET technique consists of injecting an element such as $F^{18}$ into the patient, capable of emitting positrons. The neutralization of a positron and an electron releases two γ photons emitted in opposite directions with an energy of 511 keV. The PET imagery technique makes use of this physical phenomenon, by using a gamma-camera with at least two detection heads placed on each side of the patient. The detection heads used are not equipped with a collimator. Electronic information processing, called coincidence processing, selects events that occur at the same time, and thus calculates the trajectory of gamma photons.

Therefore, detection heads are subjected to high gamma radiation fluxes. The count rate of conventional Anger type gamma-cameras is usually too limited for this type of application.

For guidance, an Anger type gamma-camera can operate normally with a detection of $1.5 \times 10^5$ to $2 \times 10^5$ events per second, although in PET imagery at least 1 to $2 \times 10^6$ events per second are necessary for normal operation.

Another limitation of Anger type gamma-cameras described above, is due to the fact that the calculation of the center of gravity of an event is fixed by the construction of the detection head and cannot be changed, and particularly by the choice of the resistances $RX^-$, $RX^+$, $RY^-$, $RY^+$, for each photo-multiplier.

Another limitation of Anger type cameras is due to the fact that, to avoid important statistical fluctuations, the photo-multiplier signal must be integrated over a fairly long time, of the order of four times the signal decay time (decay time constant of light in the crystal=250 ns). In practice, this signal is integrated over 1 μs. This integration time also limits the count rate.

DESCRIPTION OF THE INVENTION

The purpose of this invention is to propose a device for collecting and encoding signals in several photo-detectors in a camera which does not have the limitations mentioned above.

One purpose is particularly to propose this type of device for gamma-cameras enabling a higher count rate than is possible using Anger type cameras like those described above.

Another purpose of the invention is to propose a device capable of processing several simultaneous detection events.

Another purpose of the invention is to propose a device that can be used to determine the location of events based on different calculation algorithms.

Another purpose is to propose a device that enables fast treatment of data output by photo-multipliers, for a reasonable manufacturing cost.

More precisely, the invention achieves these purposes through a device for collection, digital encoding and processing of signals from plural photo-detectors in a camera. This device comprises plural digital encoding units, each digital encoding unit in the plural encoding units being associated with an individual photo-detector in the plural photo-detectors, and each encoding unit comprising, in order starting from an associated photo-detector, an analog-digital converter with a resolution equal to or greater than 7 bits, capable of converting an analog detection signal output by the photo-detector into a digital detection signal, a deconvolution unit, a digital adder to summate the digital detection signal and to output a sum signal to a common digital processing unit connected individually to each encoding unit, and a gate controlled by a control unit to direct a sliding sum of samples to the common digital processing unit each time that a given number of samples of a pulse is summated, the control unit comprising a signal comparator to compare the digital detection signal with a noise threshold, a sample comparator to compare the value of sample N+1 with the value of the previous sample N while the signal is above the noise threshold, and a counter to verify that the duration of detected pulses corresponds to a determined standard physical form.

A digital encoding unit is a functional assembly in the form of an electronic circuit capable of shaping the signal output by the photo-detector connected to it, making the sliding sum of the signal, and finally providing digital data representative of this signal. Digital data are then transmitted to the processing unit.

The device according to the invention is used for "flash" encoding of pulses with a small number of bits and with an in-line deconvolution. The gate, controlled by the control unit, directs a sliding sum of samples of a pulse to the processing unit, triggered by recognition of the pulse shape.

Starting from digital data supplied by all digital encoding units, the digital processing unit is capable of calculating the position and energy of events, in other words interactions of γ radiation and the scintillator material.

The processing unit may also be designed to form an image, called the gamma-image, starting from the calculated positions and energies of events.

Several events that take place simultaneously in the camera scintillator may be processed simultaneously using the device according to the invention. Since the analog signal from each photo-detector is processed locally by digital encoding units, it is impossible to mix and superpose analog signals from different photo-detectors.

This advantageous characteristic means that detection heads can be exposed to more active sources, or that the collimator can be removed. A high count rate is also authorized since the signal is not integrated collectively.

Furthermore, the risk of two events occurring at short time intervals from being seen to be coincident is avoided, due to the integration time of an analog integrator; encoding and integration take place at all times.

Furthermore, by directly collecting a digital signal from each encoding unit, a position of the event can be calculated using any selected algorithm programmed in the digital processing unit.

The position calculation is not fixed once and for all by a resistance and wiring network, as it is for known Anger type cameras.

The deconvolution unit included in the device according to the invention can separate signals when the time interval separating them is too short. This unit is not described in detail here. It operates in a manner known in itself. For further information, please refer to document (5) listed in the references at the end of this description.

The invention also relates to a process for collection, encoding and processing of signals from several photo-detectors, by which an individual analog-digital conversion, a deconvolution and a summation of the signal from each photo-detector are carried out in order, and a digital summation signal for each signal is then sent to a common digital processing unit.

Other characteristics and advantages of this invention will become clearer by reading the following description, with reference to the figures in the attached drawings which are given for purely illustrative and non-limitative purposes.

DETAILED DESCRIPTION OF EMBODIMENTS OF THE INVENTION

Figure 1:
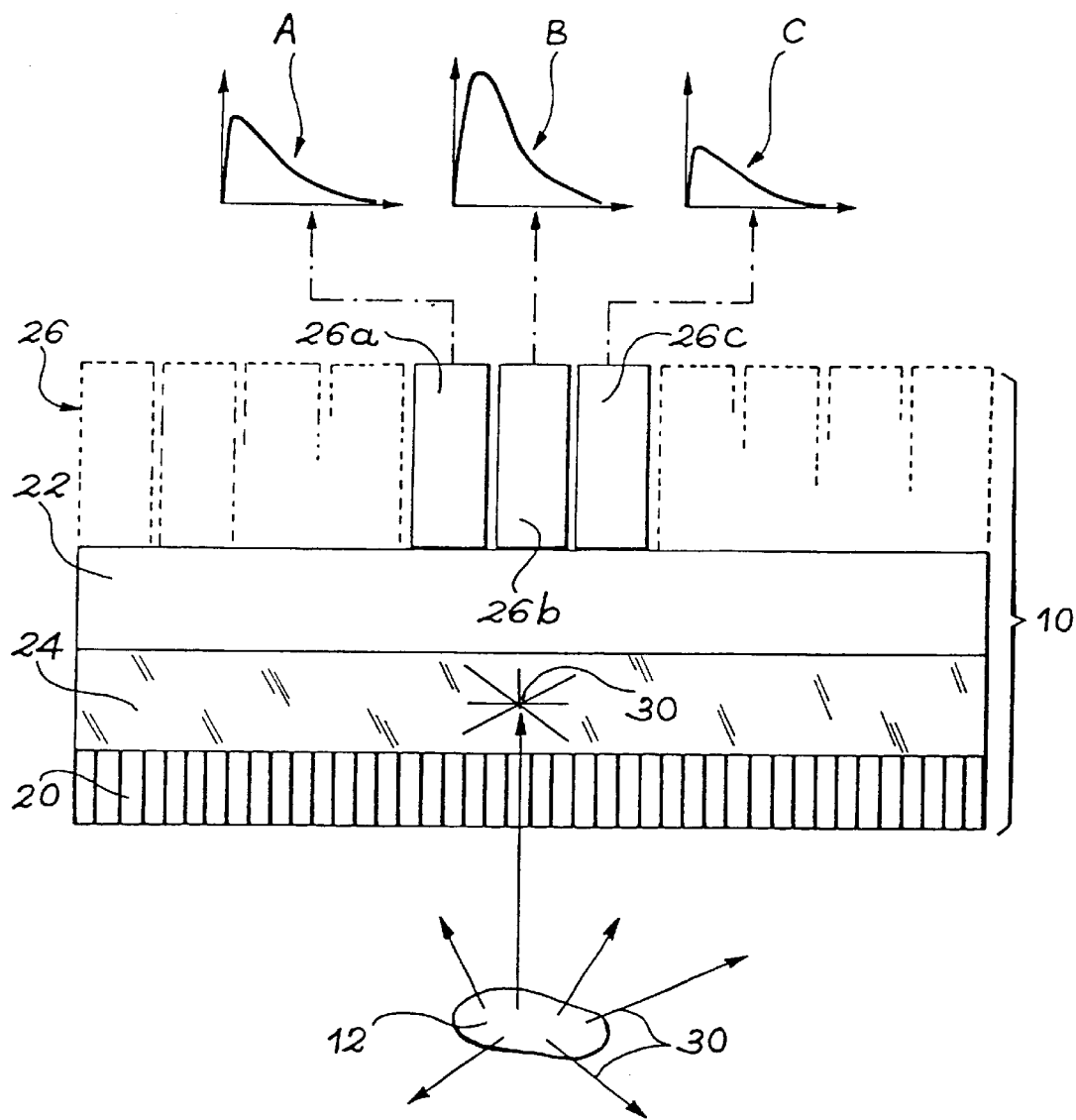
FIG. 1, already described, is a diagrammatic section through a detection head of a known Anger type camera.
Figures 2A, 2B:
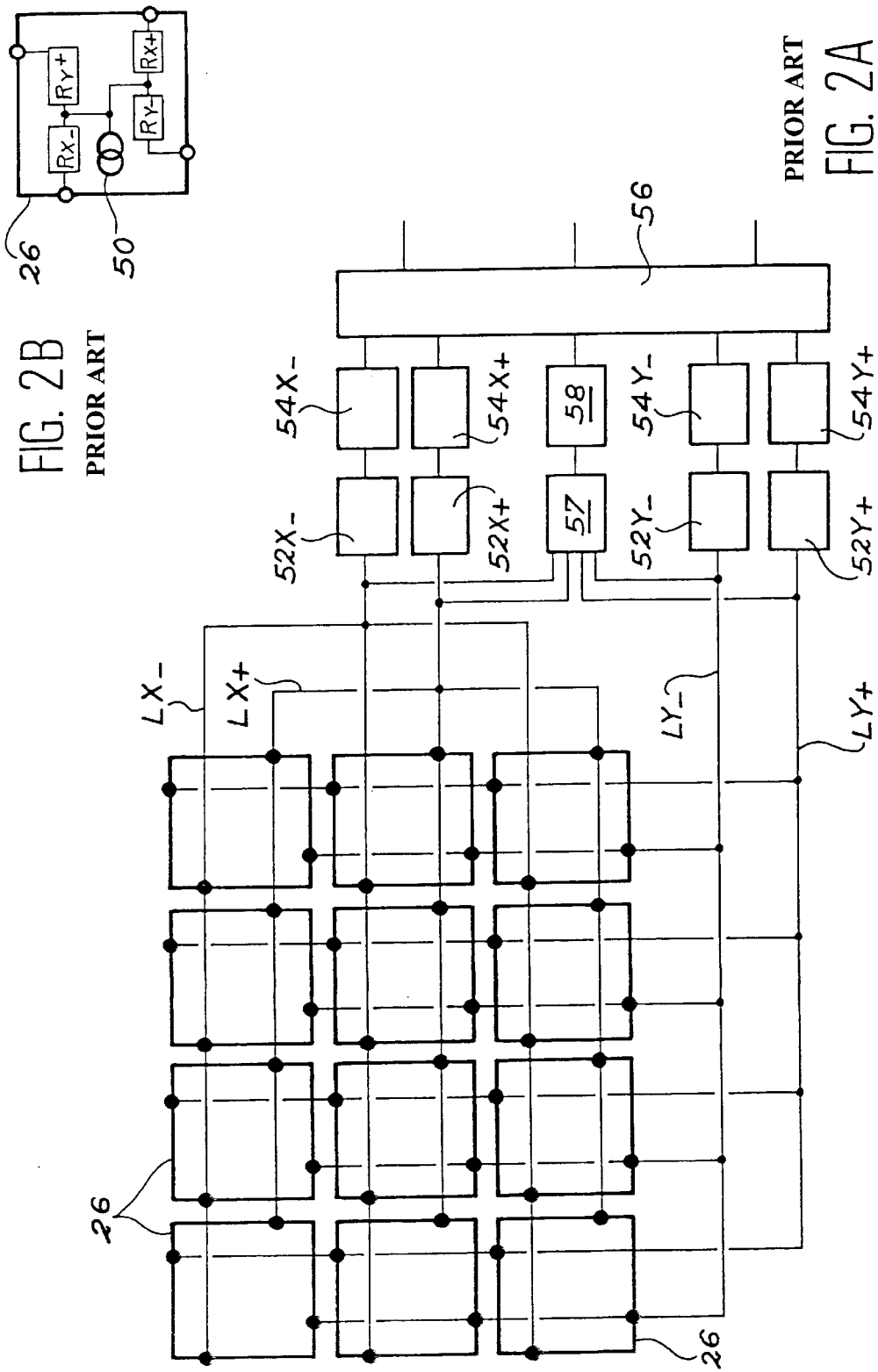
FIGS. 2A and 2B, already described, diagrammatically show a device for collection and encoding of signals originating from photo-multipliers in the detection head in FIG. 1.
Figure 3:
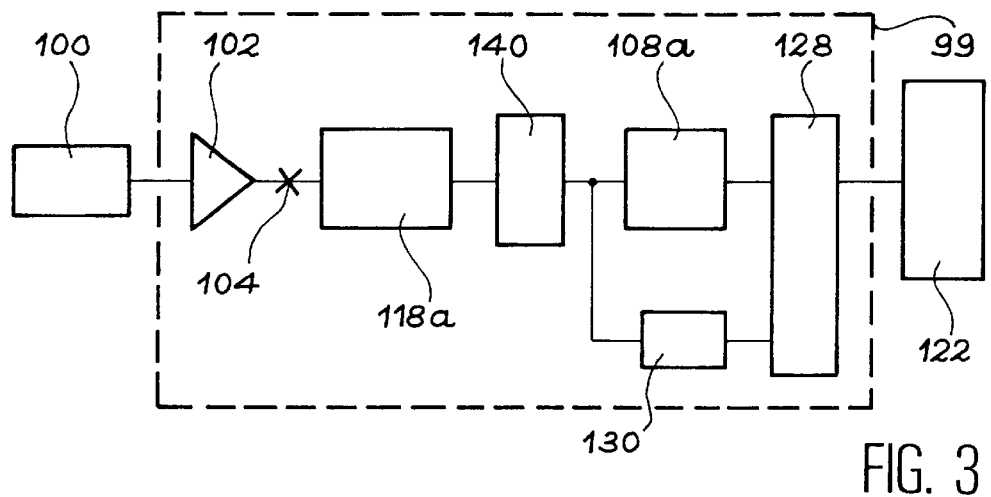
FIG. 3 is a partial diagrammatic representation of a device for collection and digital encoding of photo-detector signals, conform with a particular embodiment of the invention.

FIG. 3 shows a particular embodiment of the device according to the invention.

It represents a partial view of the device corresponding to a single photo-detector.

In the embodiment shown in FIG. 3, the photo-detector is a photo-multiplier 100 connected to a current-voltage converter 102. In response to an event detected by the photo-multiplier, a signal conforming with FIG. 4 is obtained on the output 104 from the current-voltage converter 102.

Figure 4:
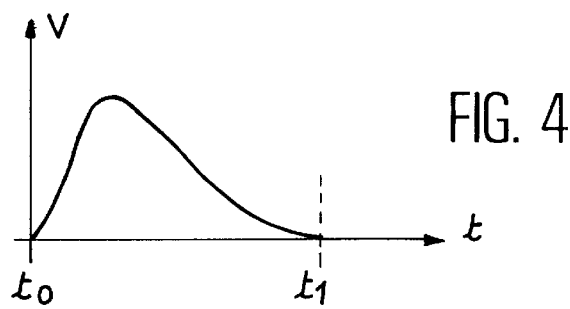
FIG. 4 is a graph showing a signal output by the photo-detector after adaptation by a current-voltage converter.

FIG. 4 is a graph in which the ordinate represents the amplitude of the signal output by a photo-multiplier, corresponding to the pulse, and the abscissa represents the time. The amplitude of the signal and the time are indicated on an arbitrary scale. FIG. 4 shows the start time $t_0$ of the pulse output by the photo-multiplier, and $t_1$ is the time at which the pulse returns to almost zero, after having passed through a maximum.

For guidance, the interval $t_1 - t_0$ is of the order of one microsecond.

Returning to FIG. 3, the analog signal present on the output terminal 104 is sent to an analog-digital converter 118a directly, instead of being sent to an analog integrator. The analog-digital converter samples each signal pulse in a number of samples denoted n.

For example, the converter samples each signal pulse in ten samples. In this case, for a 1 µs signal, the analog-digital converter takes a sample every 100 ns.

It is thus obvious that the analog-digital converter 118a is preferably a fast "flash" type converter that can operate at a frequency of the order of 10 to 20 MHz. The resolution of the converter is equal to or greater than 7 bits. For example, the resolution may be chosen to be equal to 8 bits.

The digital signal output from the analog-digital converter 118a is directed to a digital adder 108a. The digital adder takes a sliding sum of samples transmitted to it by the analog-digital converter. The sliding sum is made on a given number of samples. For example, this predetermined number may be equal to 10 for sampling at every 100 ns.

The value of the sliding sum is sent to a calculation unit 122 every time that the set of samples or a given number of samples of a pulse corresponding to an event, is summated.

The device in FIG. 3 comprises a gate 128 for this purpose controlled by a control unit 130.

The control unit 130, also connected to the output from the analog-digital converter, may be designed or programmed, for example in order to determine the instant at which the digital signal available at the output from the analog-digital converter 118a passes through a maximum, and triggers storage of the digital integral of the signal output by adder 108a in calculation unit 122, a given number of clock steps later. The fact that the digital signal passes through a maximum makes it possible to detect the presence of a pulse corresponding to an event.

The control unit comprises:
- a signal comparator to compare the signal with a noise threshold,
- a sample comparator to compare the value of a sample N+1 with the value of sample N while the signal is greater than the said noise threshold, a counter to verify that the duration of detected pulses corresponds to a determined standard physical shape.

The advantage of this solution is that it is very simple. However, it is not very accurate when the amplitude of pulses output by the photo-multiplier is low.

The control unit may also be common to all channels in the collection device. According to this variant, it may be designed or programmed so as to determine the instant at which the sum signal of all photo-multipliers (energy) passes through a maximum, and to trigger storage of digital integrals of all photo-multipliers at a given number of clock steps later.

This solution means that a particularly accurate readout of the sum can be triggered. It is particularly suitable for coincident PET type imagery applications.

According to another variant, the unit 130 may be designed and programmed to determine when a large amplitude signal originating from a photo-multiplier passes through a maximum, and to trigger transfer of the digital integral of the signal from this photo-multiplier and adjacent photo-multipliers with lower amplitude signals. This solution is also accurate, but it imposes a comparison between signals from different photo-multipliers.

According to one advantageous improvement, the device in FIG. 3 is equipped with a deconvolution unit 140 placed between the analog-digital converter 118a and the adder 108a.

This deconvolution unit 140 separates signals corresponding to two pulses output by the same photo-multiplier following two events that occur at short time intervals and at positions close to each other (in the scintillator).

Unit 140 can also process stacked signals separately. Documents (5) and (6) provide information about this subject. Deconvolution is done starting from an inverse transfer function of the assembly formed by the crystal, the photo-multiplier and the current-voltage converter 102.

With the device in FIG. 3, successive events occurring at short time intervals located at approximately the same position on the scintillator crystal can be processed separately, as described above.

Furthermore, encoding and summation take place continuously and there is no need to provide a sequence for integration of the analog signal.

Finally, for equal accuracy, an analog-digital converter 118a can be used with a resolution equal to $\sqrt{n}$ time less than the resolution of an analog-digital converter placed on the output side of the integrator, where n is the number of samples used to encode a signal pulse.

In particular, if a resolution of 10 bits is sufficient to digitally encode an analog integral output by an analog integrator, a resolution of 8 bits is sufficient to directly encode the photo-multiplier pulse at the output from preamplifier 102 in the case shown in FIG. 3. This is the case when n is equal to approximately 10.

This aspect is particularly useful. Encoders with a resolution of 8 bits are standardized and are available in an ASIC library. Thus, the entire collection and digital encoding device can easily be made in the form of an integrated circuit at low cost.

Figure 5:
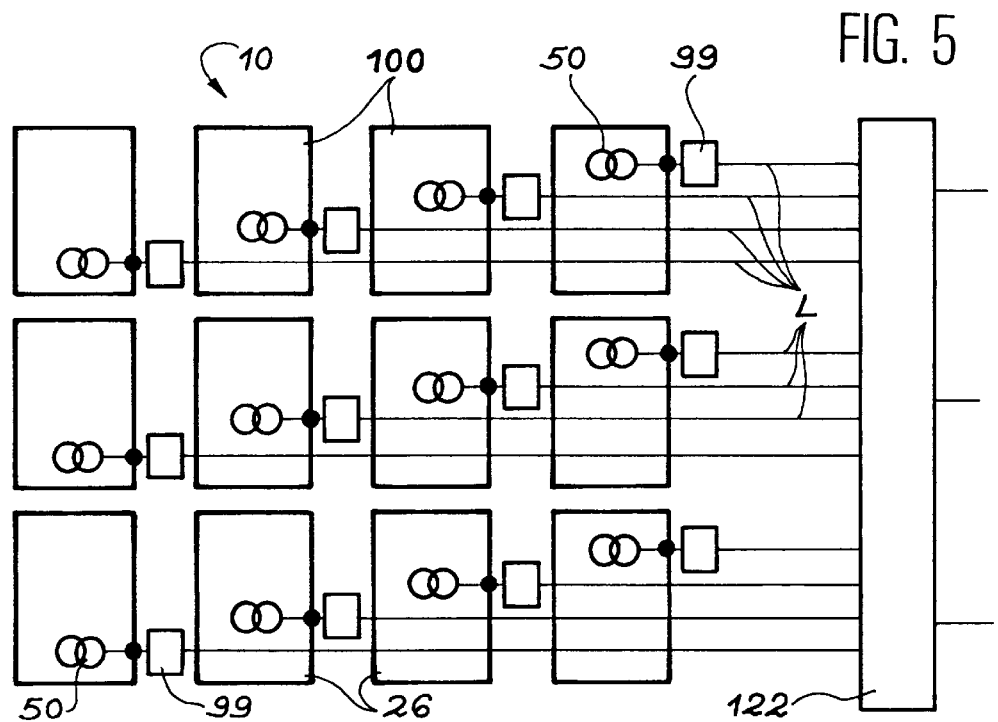
FIG. 5. is a wiring diagram for a camera equipped with a collection and digital encoding device conform with FIG. 3.

FIG. 5 shows the wiring of a detection head 10 in a camera equipped with the collection and encoding device according to the invention. The detection head 10 comprises several photo-multipliers 100, the output of which is represented symbolically as a current source 50. The output from each photo-multiplier 100 is connected to a collection and digital encoding unit 99 to individually process the signal from each photo-multiplier.

Each unit 99 may be considered as being a channel in the collection and digital encoding device according to the invention. Each unit 99 is made identically, for example as shown in the diagram in FIG. 3 described above. Collection and encoding units are individually connected to the digital calculation unit 122 through electric links L. For example, this calculation unit 122 may be programmed by software in order to determine the position, coordinates and energy of an event detected on the detection head. The calculation unit may also be programmed to set up an image seen by the camera starting from event positions and energies.

DOCUMENTS MENTIONED IN THE DESCRIPTION (1) U.S. Pat. No. 3,011,057
(2) FR-A-2,669,439
(3) U.S. Pat. No. 4,900,931
(4) U.S. Pat. No. 4,672,542
(5) FR-A-2,665,770
(6) U.S. Pat. No. 5,276,615

What is claimed is:

1. Device for collection, digital encoding, and processing of signals from plural photo-detectors in a camera, comprising:

plural digital encoding units, each digital encoding unit of the plural encoding units being associated with an individual photo-detector in the plural photo-detectors, and each encoding unit comprising, in order starting from an associated photo-detector, an analog-digital converter with a resolution equal to or greater than 7 bits, configured to convert an analog detection signal output by the associated photo-detector into a digital detection signal, a deconvolution unit, a digital adder configured to summate the digital detection signal and to output a sum signal to a common digital processing unit connected individually to each encoding unit, and a gate controlled by a control unit to direct a sliding sum of samples to the common digital processing unit each time that a given number of samples of a pulse is summated, the control unit comprising a signal comparator configured to compare the digital detection signal with a noise threshold, a sample comparator configured to compare a value of sample N+1 with a value of a previous sample N while the signal is above the noise threshold, and a counter configured to verify that a duration of detected pulses corresponds to a determined standard physical shape.

2. Device according to claim 1, wherein the analog-digital converter has a resolution of 8 bits.

3. Device according to claim 1, wherein the photo-detectors are photo-multipliers.

4. Device according to claim 1, wherein the camera is a gamma-camera.

5. Device according to claim 1, comprising a single control unit common to all digital encoding units.

6. Device for collection, digital encoding, and processing of signals from plural photo-detectors in a camera, comprising:

plural digital encoding means, each digital encoding means of the plural encoding means being associated with an individual photo-detector in the plural photo-detectors, and each encoding means comprising, in order starting from an associated photo-detector, analog-digital converting means with a resolution equal to or greater than 7 bits, for converting an analog detection signal output by the associated photo-detector into a digital detection signal, deconvolution means, digital adder means for summing the digital detection signal and for outputting a sum signal to a common digital processing means connected individually to each encoding means, and a gate means controlled by a control means for directing a sliding sum of samples to the common digital processing means each time that a given number of samples of a pulse is summated, the control means comprising signal comparator means for comparing the digital detection signal with a noise threshold, sample comparator means for comparing a value of sample N+1 with a value of a previous sample N while the signal is above the noise threshold, and counter means for verifying that a duration of detected pulses corresponds to a determined standard physical shape.

* * * * *

UNITED STATES PATENT AND TRADEMARK OFFICE
CERTIFICATE OF CORRECTION

PATENT NO. : 6,680,750 B1
DATED : January 20, 2004
INVENTOR(S) : Tournier et al.

It is certified that error appears in the above-identified patent and that said Letters Patent is hereby corrected as shown below:

<u>Title page,</u>
Item [75], Inventors, should read:
-- [75] Inventors: Edmond Tournier, Saint Martin d'Uriage (FR); Claude Janin, Grenoble (FR); Corinne Mestais, La Terrasse (FR) --

Signed and Sealed this

Eleventh Day of May, 2004

JON W. DUDAS
*Acting Director of the United States Patent and Trademark Office*